(12) United States Patent
Moen

(10) Patent No.: US 7,556,465 B2
(45) Date of Patent: Jul. 7, 2009

(54) APPARATUS AND METHOD FOR HIGH THROUGHPUT PARTICULATE MATTER FROM LARGE CAPACITY STORAGE BINS

(75) Inventor: Larry K. Moen, Cedar Falls, IA (US)

(73) Assignee: U.S. Grain Storage System, Inc., Cedar Falls, IA (US)

( * ) Notice: Subject to any disclaimer, the term of this patent is extended or adjusted under 35 U.S.C. 154(b) by 0 days.

(21) Appl. No.: 10/883,288

(22) Filed: Jul. 1, 2004

(65) Prior Publication Data

US 2005/0036860 A1  Feb. 17, 2005

Related U.S. Application Data

(60) Provisional application No. 60/484,931, filed on Jul. 2, 2003.

(51) Int. Cl.
- B65G 1/00 (2006.01)
- B65G 11/16 (2006.01)
- E04H 7/00 (2006.01)

(52) U.S. Cl. ............................ 414/293; 52/195; 52/247; 193/34

(58) Field of Classification Search ................. 414/293, 414/288, 313, 308, 309, 322, 326, 327, 268, 414/272, 291, 297, 304; 52/195, 247; 222/564; 193/12, 28, 2 D, 14, 29, 34, 25 A, 22
See application file for complete search history.

(56) References Cited

U.S. PATENT DOCUMENTS

| | | | |
|---|---|---|---|
| 1,208,075 A | 12/1916 | Allsteat | |
| 1,259,583 A * | 3/1918 | Adams | ........................ 414/269 |
| 1,381,894 A | 6/1921 | Stafford | |
| 1,417,316 A | 5/1922 | Green | |
| 1,977,391 A | 10/1934 | Kramer | |
| 2,907,501 A | 10/1959 | Laird | |
| 3,341,090 A | 9/1967 | Reimbert | |
| 3,531,874 A | 10/1970 | Sukup | |
| 3,707,249 A * | 12/1972 | Tomlinson | ................... 222/564 |
| 3,931,877 A * | 1/1976 | Albaugh | ...................... 193/15 |
| 3,991,913 A | 11/1976 | Steffen | |
| 4,137,682 A | 2/1979 | Trumper | |
| 4,330,232 A | 5/1982 | McClaren | |
| 4,449,339 A * | 5/1984 | Bubb et al. | .................... 52/195 |
| 4,454,693 A * | 6/1984 | Price | ........................... 52/248 |
| 4,790,111 A | 12/1988 | Johinke | |
| 4,862,661 A * | 9/1989 | Moore | ......................... 52/247 |
| 5,632,674 A | 5/1997 | Miller | |
| 5,735,377 A * | 4/1998 | Herren | ........................ 193/33 |
| 6,499,930 B1 | 12/2002 | Dixon | |

\* cited by examiner

*Primary Examiner*—Gregory W Adams
(74) *Attorney, Agent, or Firm*—McKee, Voorhees & Sease, P.L.C.

(57) ABSTRACT

An apparatus and method for unloading a grain or particulate matter large capacity storage bin. The apparatus includes a bin with a cylindrical side wall. A relatively large opening is provided in the side wall. A box frame is generally vertically installed to the inside of the bin and intersects the opening in the side of the bin. A plurality of inlets into the box frame are spaced apart along the inner most side of the box frame. The box frame defines a channel that intersects with the opening in the bin. The plurality of smaller openings control the flow of particulate matter into the channel to allow control but fast unloading of the bin by gravity.

17 Claims, 14 Drawing Sheets

SIDE VIEW DOX FLUME

**INLET ALOWS 6"X32"
OF GRAIN FLOW AT 21D**

APPARATUS AND METHOD FOR HIGH THROUGHPUT PARTICULATE MATTER FROM LARGE CAPACITY STORAGE BINS

CROSS-REFERENCE TO RELATED APPLICATIONS

This application is a conversion of U.S. Provisional Application No. 60/484,931 filed Jul. 2, 2003, which is herein incorporated by reference in its entirety.

BACKGROUND OF THE INVENTION

1. Field of the Invention

The present invention relates to apparatus and methods for unloading particulate matter bins; in particular, to apparatus and methods for unloading such bins at a substantially high rate.

2. Problems in the Art

Harvested whole grain usually is temporarily stored prior to further use. One common storage device even for relatively large volumes (e.g. tens to even hundreds of thousands of bushels) is a round bin made of relatively thin corrugated sheet metal placed on top of a concrete base and covered with a roof. Such bins typically vary in size from 48 to 120 feet in diameter and 60 to 140 feet tall. They are relatively inexpensive and thus particularly suited for temporary storage of grain such as on a user's property prior to shipping it to a larger storage facility, e.g. a local grain elevator, or loading it for transportation to a distant location, e.g. by truck or train to a grain processing facility. Bins of these types are used in many different commercial establishments (e.g. grain company).

A grain bin offers protection to the grain from environment, e.g. moisture, animals, insects, and sun. It also allows use of gravity or mechanized systems to assist in unloading the bin.

The conventional unloading configuration utilizes a concrete floor with an opening. A gate or door can be placed across the opening. An auger has a first end underneath the opening. The gate is opened and gravity feeds grain to the auger. The auger extends from underneath the bin to a conveying mechanism. The conveying mechanism elevates the grain so that it can fall by gravity into a transport vehicle (e.g. wagon, semi-trailer, train car).

One deficiency of such an unloading system is a limitation on the rate or speed grain can be removed from the bin. Typically on the order of 9,000 bushels per hour can be removed. This translates into two or three semi-truck trailers an hour.

As is widely known, commodity prices of most grains is relatively low compared with production costs. Profitability therefore depends not only on the efficient and economical production of the grain, but also its post-harvest handling, including storage and transport. As a practical reality of agriculture, minimization of costs for such things as grain storage and transport sometimes make the difference between commercial viability of the farmer or not.

Thus, there is a continual need in the art to find ways to minimize costs. One way would be to speed up the unloading process from grain bins. This would decrease labor and equipment costs. It is typical that the cost of unloading a grain bin into a vehicle like a truck or train is based on, at least in part, the time and labor involved.

Storage devices holding much more grain are sometimes used which have unloading systems that are much quicker. However, they tend to be substantial structures and very costly; certainly outside feasibility for most farmers. There have been attempts to construct storage bins of concrete or other more robust structures than corrugated sheet metal. They tend to allow more robust and, therefore, greater throughput when unloading. Again, however, the cost is substantially higher than the aforementioned sheet metal bins.

This issue has been recognized in the art. One attempted solution was to create an opening in the side of the metal bin and install an outlet chute with a gate or door. Gravity would force grain out the opening. If the opening was sized sufficiently, the throughput could substantially exceed that attainable with the conventional bottom unloading auger. However, forces and pressures created during unloading tend to deform the bin on the side of the opening, or movement of grain along the interior wall of the bin near the opening over time would cause wear to jeopardize the structural integrity of the wall. While retro-fitted strengthening structure could be added to try to resist deformation, it adds to the cost and complexity of the bin. It also would not solve the frictional erosion of the bin wall.

Additionally, the bottom auger system still must be maintained to unload grain of the opening level in the bin. Thus, this solution was not satisfactory. Any decrease in cumulative unloading time for the bin many times is offset by either reduced longevity of the bin or added cost to overcome the problems created by the modification.

An attempt to improve on the side loading concept utilized a 3-sided vertical channel member that extended substantially from at or near the top of the bin to near the bottom of the bin essentially creating a vertical conduit along the sidewall of the bin using the bin wall as one side of the channel. The outlet in the sidewall of the bin was positioned along that conduit. Spaced apart openings existed on the interior vertical wall of the conduit. The conduit could be secured to the interior side of the bin wall by welding, bolts, or other connection hardware. The conduit thus both somewhat strengthened that portion of the bin wall and attempted to reduce wear on the bin wall by providing multiple openings into the free-fall space in the channel. Instead of pushing and wearing along the side of the bin, it was hoped that most of the pressure would be exerted on the inner side of the conduit and there would be reduced wear on the side wall of the bin. However, it has been found to be generally true that the arrangement did not materially decrease erosion and damage to the bin wall sufficiently to merit use. Controlled, efficient flow of grain into the conduit was not consistent. Brakes or flumes had to be installed to try to control flow. Wear to the bin wall remained a problem. Therefore, this potential solution has not been adopted by the industry.

Attempts have also been made to improve on auger removal systems. Larger and faster augers have been developed and tried. This tends to increase cost, not only of structure but also energy costs in operating such structure. Additionally, it is becoming more common to pay higher prices for grain of higher quality. Quality, particularly of grain used for oil content and of grain milled for human or animal consumption, can be detrimentally affected by augers. The interface between the seed and the auger slating and wall can reduce the price paid for the grain.

Therefore, there remains the need in the art for a better system for unloading grain storage structures.

SUMMARY OF THE INVENTION

It is a primary object, feature, aspect, and advantage of the present invention to present an improvement or solve deficiencies in the art.

Other objects, features, aspects, and/or advantages of the present invention include an apparatus and method which:

a. allows a substantially increased unloading rate from grain storage structures utilizing gravity as the primary moving force;

b. decreases unloading time for grain storage structures economically;

c. provides capability of increased unloading rates without substantial detrimental risk to the structural integrity or longevity of the grain storage structure;

d. can be retro-fitted to existing structures or installed as original equipment;

e. utilizes natural forces instead of fossil fuel based energy sources;

f. can reduce overhead for grain producers;

g. is durable;

h. can be adopted and scaled for different designed needs.

i. allows efficient unloading to rail cars directly from bin.

j. provides increased structural stability to a bin.

k. reduces damage to grain or other materials, and/or improves quality of handled grain.

l. can be applied to other particulate matter storage bins.

These and other objects, features, aspects, and advantages of the present invention will become more apparent with reference to the accompanying specification.

Figure 1:
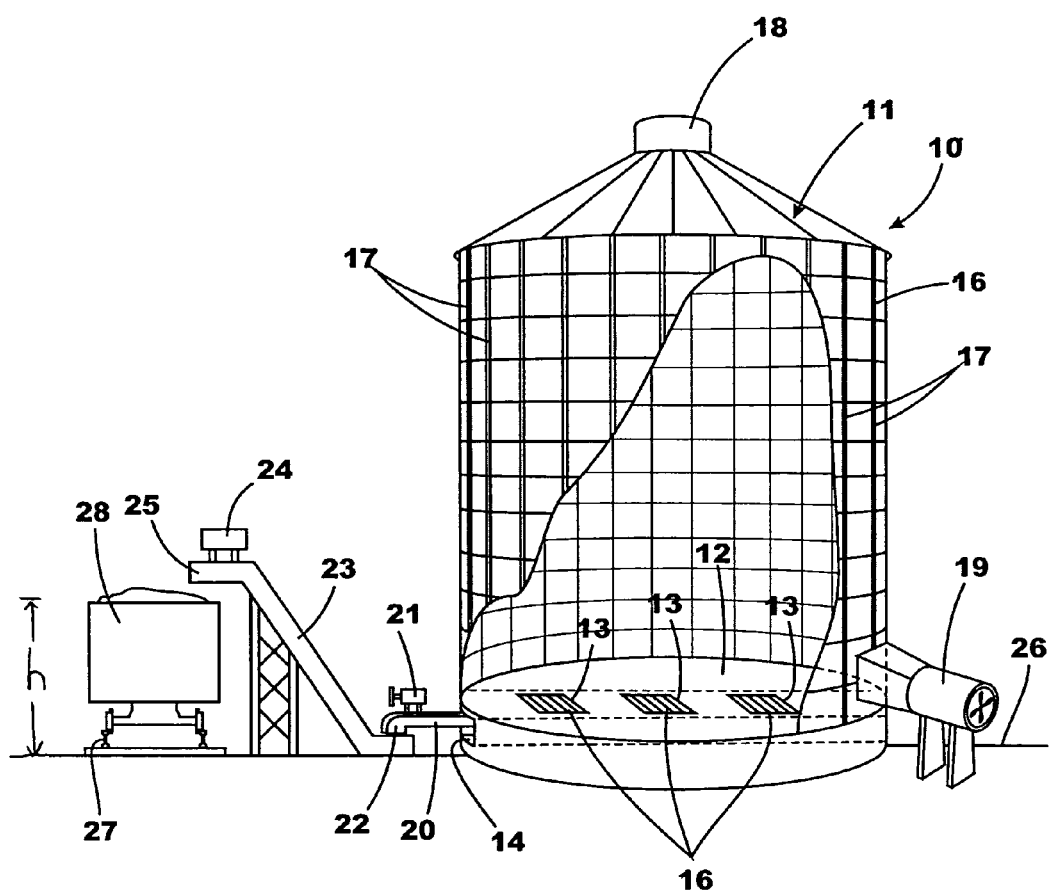
FIG. 1 is a simplified perspective view of a conventional sheet metal wall grain bin on a concrete pad, and illustrates a bottom auger unloading system adapted to remove grain from the bin for loading into a transport vehicle such as train cars.

The drawings are not to scale, but rather attempt to illustrate features or aspects of the invention.

DETAILED DESCRIPTION OF EXEMPLARY EMBODIMENT

A. Overview

For a better understanding of the present invention, one form the invention can take will now be described in detail. Frequent reference will be made to the appended drawings. Reference numbers and letters will be used to indicate certain parts and locations in the drawings. The same reference numbers and letters will be used to indicate the same parts and locations throughout the drawings unless otherwise indicated.

B. General Environment of Exemplary Embodiment

This detailed description will be in reference to an unloading system for a conventional sheet metal walled grain bin 10 (see FIG. 1) having a cylindrical corrugated sheet metal wall 16 between a concrete pad or floor 12 (e.g. extends 3 feet above grade) and a roof 11. These types of grain storage bins are well known in the art and available commercially from a variety of manufacturers. Typically these bins are 48 to 120 feet in diameter and 60 to 140 feet tall. They typically are built in stages; e.g. built upon the two first rings of sheet metal that are constructed in advance. Jacks are attached to the first two rings and additional rings are added below to complete the structure. Each ring is 44 inches tall and can be made from 44" tall by 104" long sheets of corrugated steel bolted end to end. An opening 18 (typically in roof 11) allows grain to be loaded from the top. One or more openings 13 in concrete floor 12 is above a tunnel 14 across concrete pad 12. A grate and/or grates 16 can be installed over opening(s) 13.

Typically vertical stiffeners or supports 17 extend between roof 11 and floor 12 to improve structure rigidity of bin 10. These vertical supports may be external or internal. Typically, supports 17 are external to allow a sweep auger to sweep across the floor 12. Supports 17 are equally spaced apart around the circumference of bin 10.

Fan(s) 19 can be in communication with the interior of bin 10 to control moisture in bin 10.

A typical unloading system for conventional bins 10 is a generally horizontal auger 20 in communication with and along tunnel 14 and having an end extended outwardly from bin 10. A motor 21 turns auger flighting (not shown) in auger 20 to move grain that has fallen into tunnel 14 through grate(s) 16 by gravity to an outlet spout 22. A sweep auger (not shown but well known in the art) can direct grain from across surface 12 to grates 16 (or otherwise to auger 20). Sometimes when the bin is almost unloaded with auger 20 (and sweep auger), workers still have to enter and either shovel or sweep remaining grain into tunnel 14 or use other means to remove the remaining grain from bin 10; however, reoccurring commodity does not require sweeping. Bins 10 typically have flat floors which, of course, would leave a substantial amount of grain in bin 10 if only auger 20 is used to unload bin 10.

FIG. 1 illustrates that additionally some kind of conveying mechanism 23 could be used to elevate grain removed from bin 10 by auger 20 to a height that could be poured or directed into railcar 28. Typically the height "h" needs to be approximately 16 to 18½ feet above track level to load most semi-truck trailers and rail cars. Some type of motor 24 could actuate conveying mechanism 23 to move grain to spout 25, which would direct grain by gravity into rail car 28 on track 27 on ground 26. Mechanism 23 could be, for example, a conveyor, auger, elevator, vacuum conveyor, etc.

As previously discussed, this conventional, well-known grain storage and unloading combination provides a relatively economical storage structure using concrete, corrugated sheet metal, and other conventional, relatively inexpensive building materials. It also represents a mechanical method of unloading at least a majority of grain from bin 10, as compared to manual unloading. Auger 20 is relatively inexpensive.

However, as also mentioned, there are practical limitations on the speed of unloading of bin 10 with the system of FIG. 1. Typically, such systems can unload on the order of 9,000 bushels per hour. Bins like bin 10 can hold on the order of 60,000 to 750,000 bushels (specifically a 48 foot diameter by 113 foot tall bin can hold 115,000 bushels of field corn at 5% compaction). Rail cars typically have a capacity of around 3,500 bushels of corn.

The practical realities of the grain business is that better shipping prices (i.e. cheaper transportation costs) are obtainable if transportation can be by long trains (e.g. hundred-car trains). Therefore, large concrete grain elevator storage of grain usually receives better transportation prices because it has enough grain to fill long trains and/or unloading into the cars can be done much more quickly than from metal bins such as bin 10. Therefore, typically one cannot receive the advantageous shipping price if unloading grain from bins like bin 10 with unloading systems like augers 20 and 23, because it takes so much time to load multiple railcars and/or there is not enough storage capacity in the bins to load multiple railcars.

Still further, auger unloading is advantageous because of a relatively inexpensive small device that can be installed to tunnel 14 to mechanically remove grain so it can be loaded to the railcars. However, this takes a motor and thus uses fuel and energy. It also can damage grain. Grain can get caught, crashed, cut, or otherwise damaged by the mechanical action of the auger. Presently, better prices are obtainable for higher quality grain (particularly oil bearing grain and milling quality grain). And, as mentioned, conventional auger systems are not very fast.

C. General Structure of Exemplary Embodiment

Figure 2:
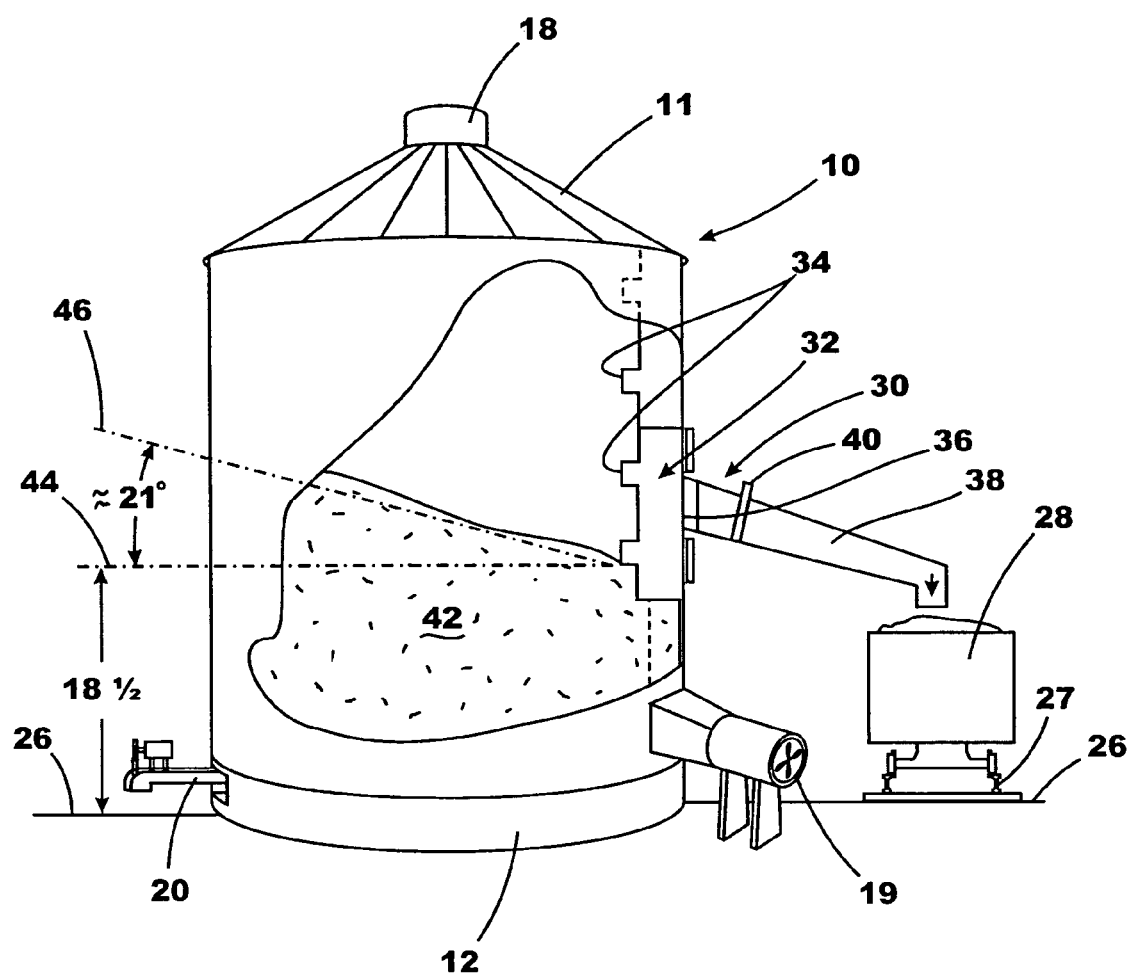
FIG. 2 is similar to FIG. 1 but illustrates a side unloading system, according to one exemplary embodiment of the present invention, added to the storage bin.

FIG. 2 illustrates bin 10 with the addition of what will be referred to as side unload system 30. As shown in FIG. 2, auger 20 optionally can still be utilized to either unload simultaneously with side unload 30 or to unload remainder of grain from bin 10 that cannot be unloaded through side unload 30.

Side unload 30 includes essentially an enclosed channel that usually would extend vertically from at or near roof 11 down to floor 12. This vertical channel is referred to generally by reference numeral 32. A plurality of interior inlets 34 are spaced apart on the interior side of channel 32 and extend inwardly of bin 10 from channel 32. An outlet 36, in communication with channel 32, extends through the side of bin wall 16. A spout 38 with rack and pinion gate 40 (commercially available) can extend over a loading zone for a railcar 28 or other transportation vehicles.

As also illustrated in FIG. 2, side unload system 30 relies on gravity. Grain like corn will flow out an opening in the side of the bin by entering inlets 34 essentially horizontally, then falling into channel 32 and then exiting through outlet 36. Spout 38 directs the grain to a desired location, all by gravity. As indicated in FIG. 2, once the grain gets beneath outlet 36, side unload system 30 will no longer function. However, grain will tend to, by gravity, move out to spout 38 until it is at approximately 21 degrees (can slightly vary, e.g. with a moisture level of grain) to outlet 36 (see line 46 in FIG. 2).

Remaining grain 42 in bin 10 can either be unloaded by auger 20 (or other means) or more grain can be introduced through entrance 18 of bin 10 and unloaded with side unload 30.

In this embodiment, for a flow rate of approximately 30,000 bushel per hour, channel 32 is 32 inches wide and 34 inches deep. Inlets 34 are 32 inches wide, 7 inches tall, extend approximately 4 inches away from channel 32. Outlets 36 is 32 inches wide and 34 inches tall, and extends approximately 6 inches outwardly of channel 32. In other embodiments, the flow rate may be varied by resizing the channel 32, inlets 34, and outlets 36.

Figure 3:
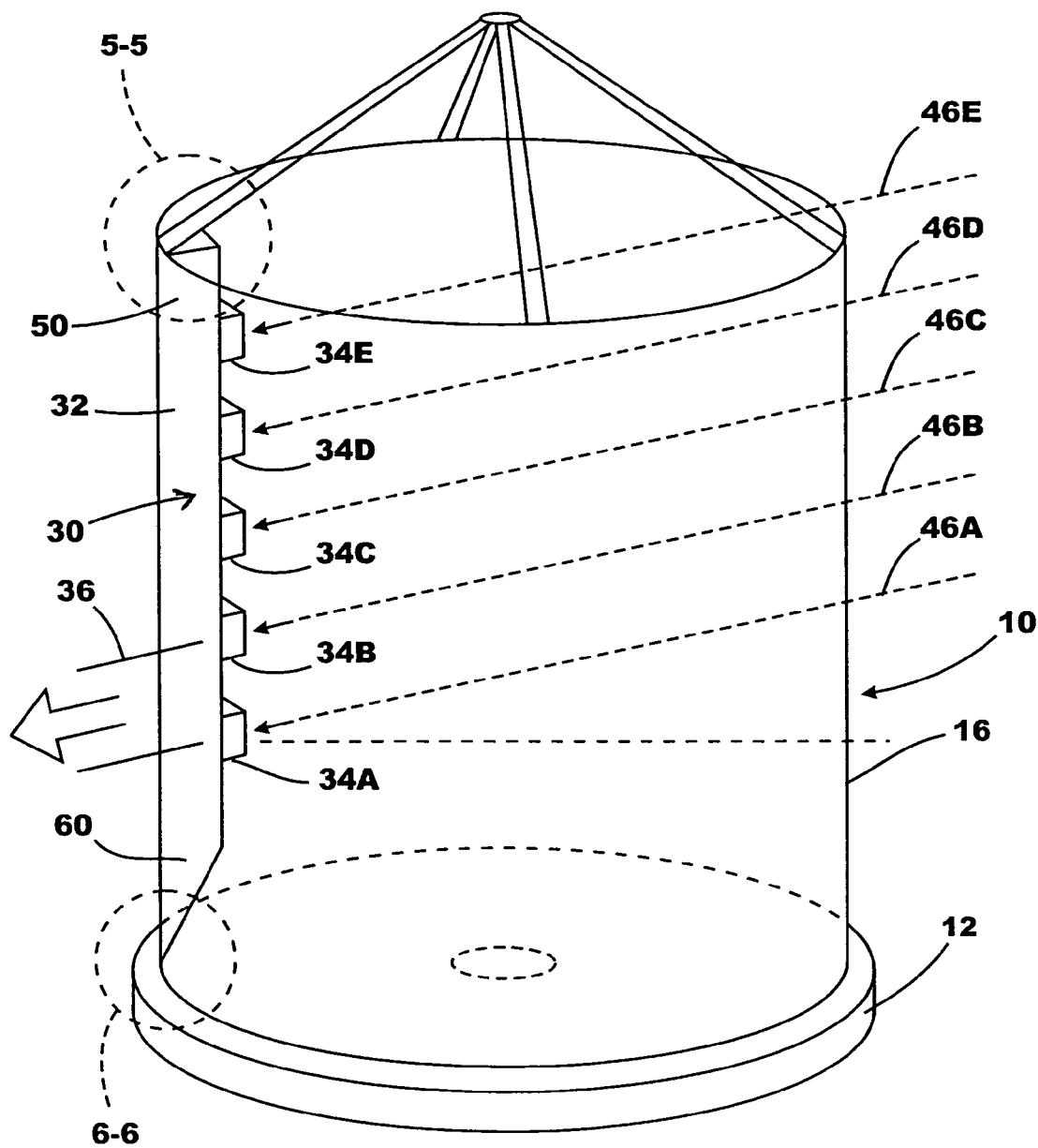
FIG. 3 is a diagrammatic view of the side unloading system of FIG. 2.

FIG. 3 illustrates how channel 32 extends essentially from top to near the bottom of bin 10 and is supported by legs next to the outer edge of the bin. This allows a sweep auger to turn radially around the center without obstruction. Lines 46A-E indicates diagrammatically parallel planes at 21 degree angles to each of inlets 34A-E. This shows diagrammatically how when bin 10 is filled, grain would enter openings 34A-E, and fill up channel 32. When gate 40 is opened, grain in channel 32 would move out of channel 32 into outlet 36 to spout 38. As the grain in channel 32 drops, grain would fall into channel 32 through opening 34E until the height of grain in the bin reduces to one level of line 46D. The top of grain 42 in bin 10 would then, at approximately a 21 degree angle, slowly drop until gate 40 is closed. Continued unloading could then recommence by opening gate 40.

Once grain drops in bin 10 below line 46A, gravity will have ceased to enable to move grain out of bin 10 and out of outlet 36. Bottom unloading or refilling of bin 10 will allow further unloading of bin 10.

Figure 4:
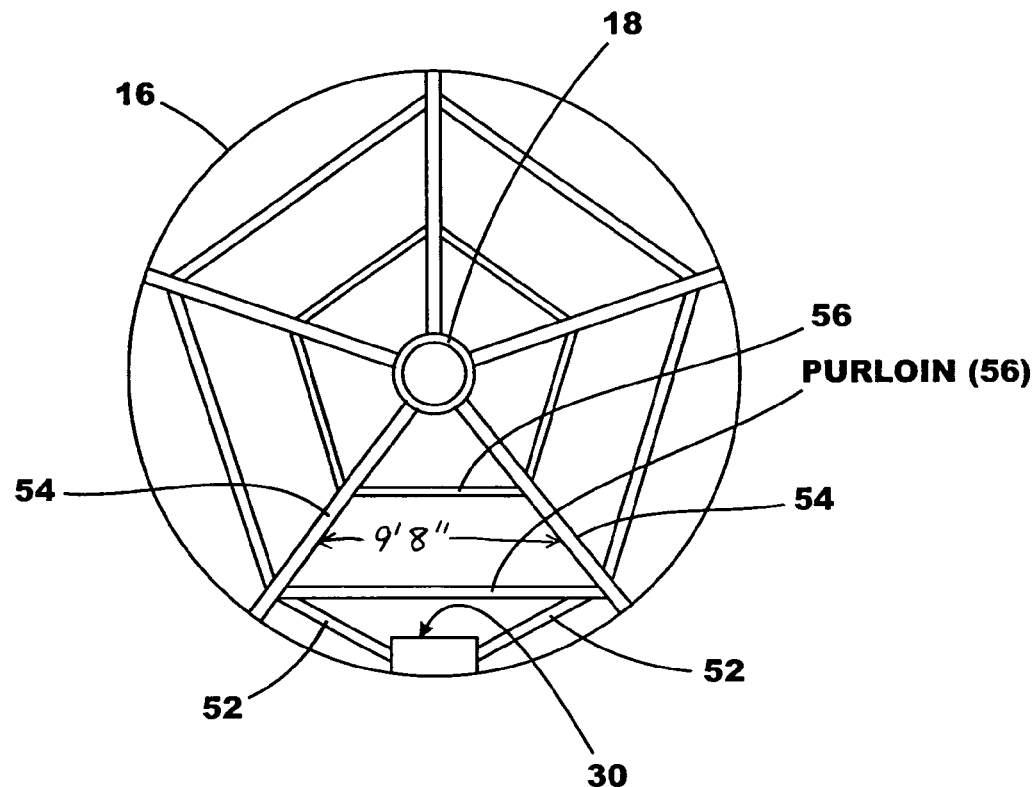
FIG. 4 is a top plan view diagrammatically illustrating connection of the top of the side unloading system to roof rafters of the bin.
Figure 5:
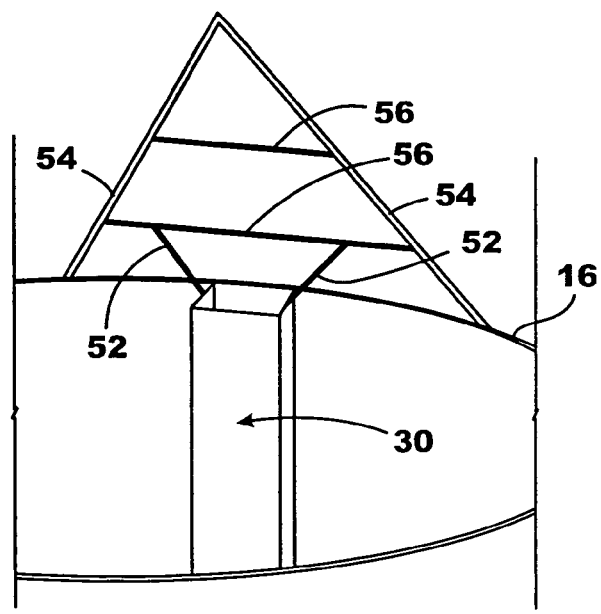
FIG. 5 is taken along line 5-5 of FIG. 3.

The top of channel 32 can be supported as shown in FIGS. 3-5. Converging main rafters 54 supporting roof 11 are joined by cross-members 56. Additional sub-rafters or stabilizing members 52 could be connected to cross-members 56 and the top of channel 32 of side unload system 30 to add support to it. Sub-rafter 52 could be wood or metal and be connected by bolts or screws or other means. Of course other ways of supporting the top of channel 32 are possible.

Figure 6:
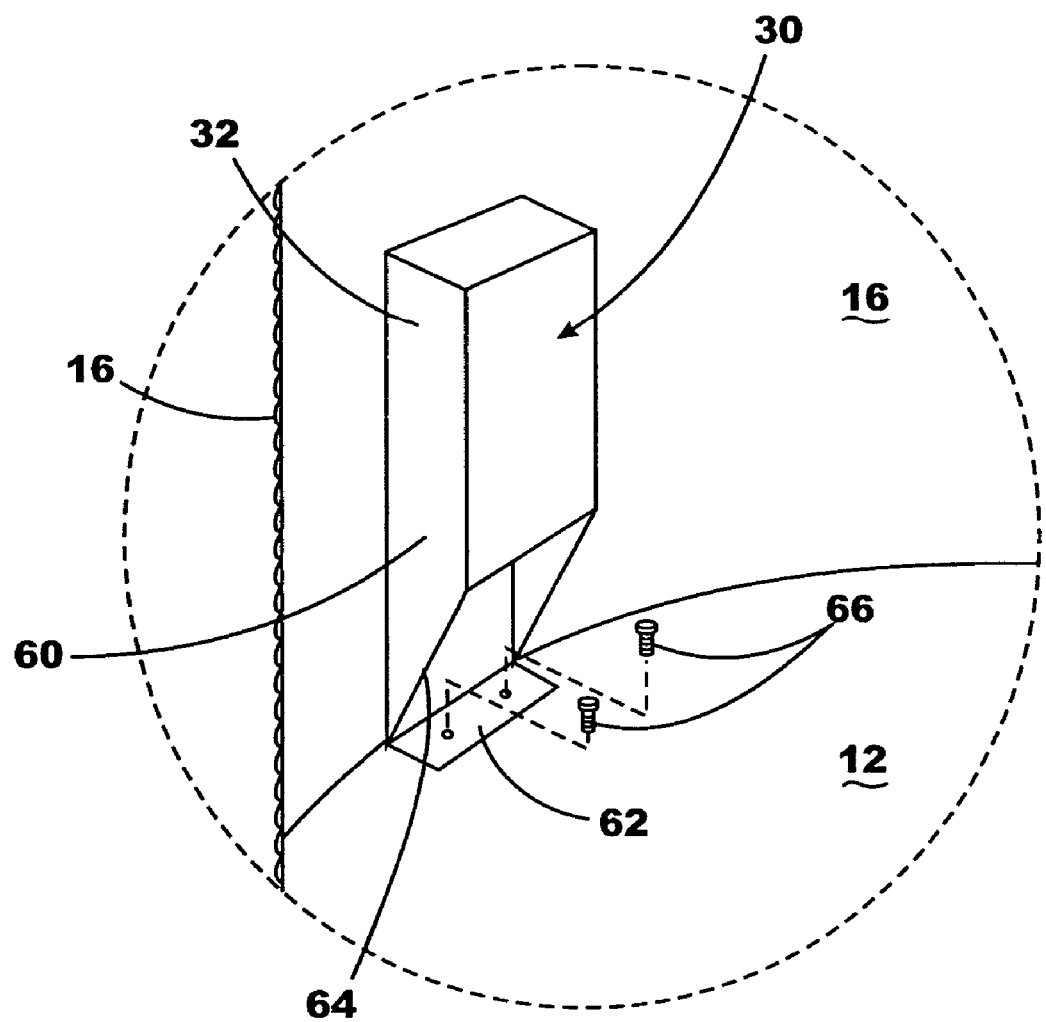
FIG. 6 is taken along line 6-6 of FIG. 3, illustrating attachment of the bottom of the side unloading system to the floor of the bin.

FIG. 6 illustrates two features of the bottom of channel 32. First, a flange connection 62 can have openings through which concrete bolts or screws 66 can attach it to concrete floor 12. This also will help stabilize side load system 30 in bin 10. Additionally note the bottom end 60 of channel 32 is tapered (see reference numeral 64). It is also open. Thus, grain entering channel 32, but not exiting output 36 would pile up in channel 32 to the level of grain in bin 10. As the level drops below taper 64, grain would also drop out the open end of bottom 60 of channel 32 to be removed.

The taper 64 ends 12-14" above the concrete floor 12 and is designed to allow bottom sweeping augers or other mechanisms to rotate to the very edge of floor 12 to completely remove grain if needed.

D. Specific Structure of Exemplary Embodiment

Figure 7:
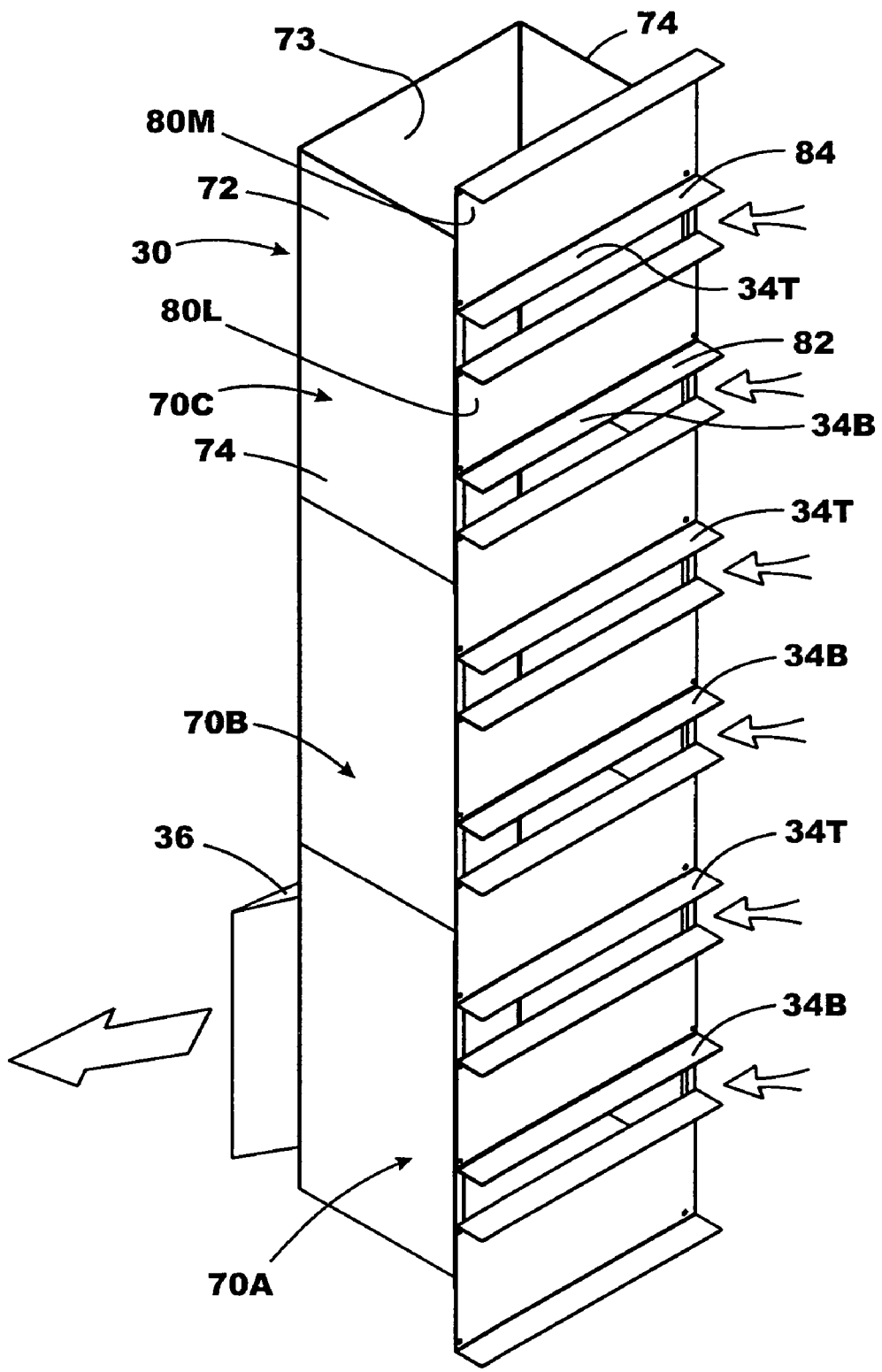
FIG. 7 is an enlarged perspective view of the side unloading system of FIG. 2 in isolation.
Figure 11:
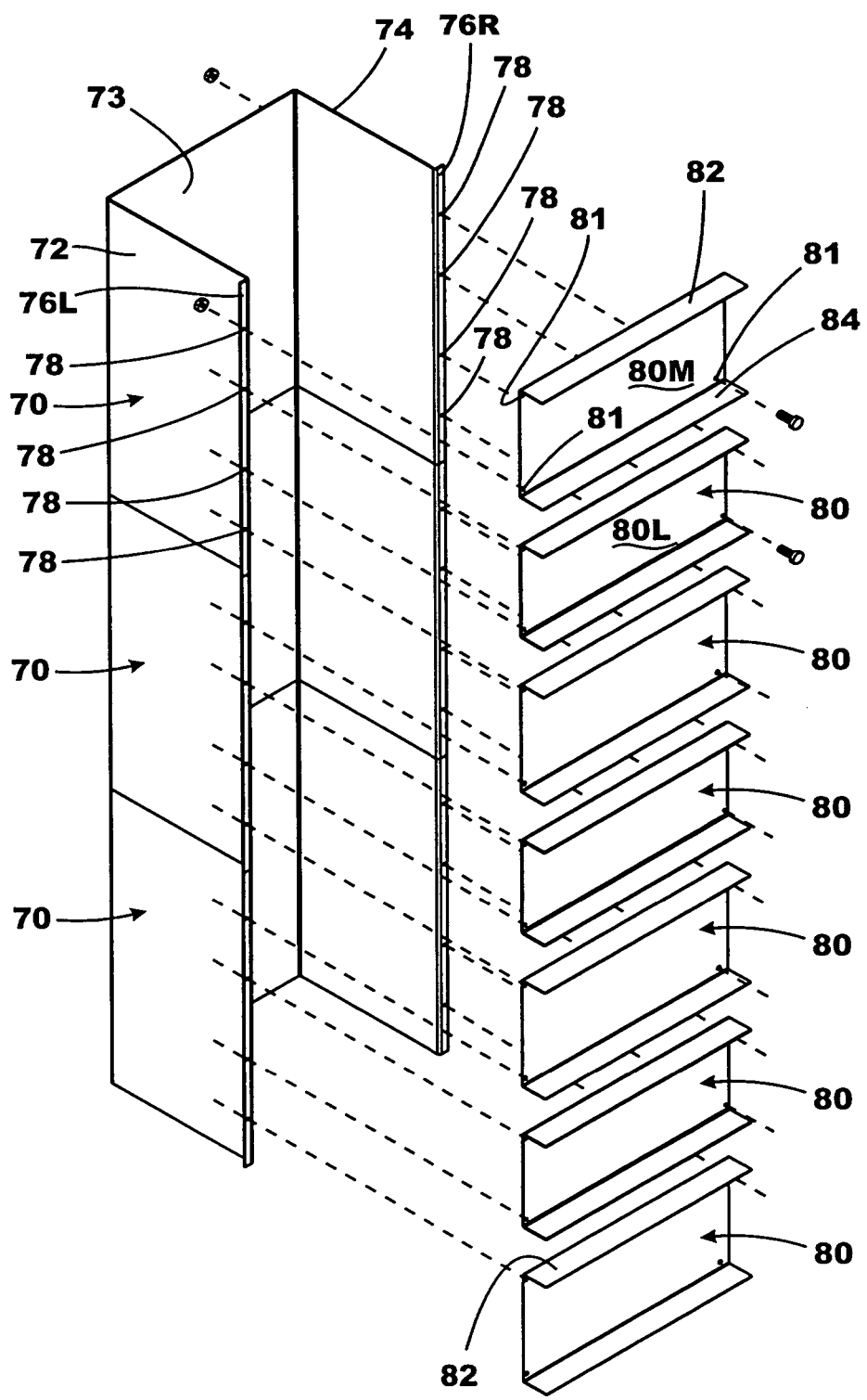
FIG. 11 is an exploded view of FIG. 7.

FIGS. 7-15 show in more detail the specific structure of side unload system 30. Side unload system 30 can be made up of individual sections that can be integrated to form a continuous vertical channel with the plurality of spaced apart inlets 34 and at least one outlet 36. As shown in FIG. 11, individual sections can be built from basically U-shaped sections 70 each having a side wall 72, middle wall 73 and an opposite side wall 74, with outward extending flanges 76 L and R at the outer edges of walls 72, 74. Each section 70 can be built one under the other (by attachment to succeeding rings of bin 10 as it is built) to create a substantially continuous channel 32 from bottom of the bin to the top once bin 10 is completely erected. What will be called front covers 80 have top and bottom horizontal flanges 82 and 84 and preformed bolt holes 81. System 30 is installed inside of bin 10 by bolting it to side wall 16. Washers (e.g. urethane) could be placed on the outside of the bin with the bolt head outside of the bin. When a section 70 is attached to the bin wall 16, it is tightened such that the bolt head compresses the washer against the outside of the bin to form a fluid tight seal. Covers 80 would be bolted to flanges 76 L and R of sections 70. Covers 80 would be staggered relative to sections 70. As shown in FIGS. 7 and 11, a cover 80M is bolted leaving bottom 84 spaced approximately 7 inches above top 82 of the cover 80T immediately below it. This forms the inlet opening 34. At the appropriate point, a section 70 which includes outlet 36 is installed at an opening formed in the side 16 of bin 10.

FIGS. 7-15 include various dimensions for this embodiment.

Figure 8:
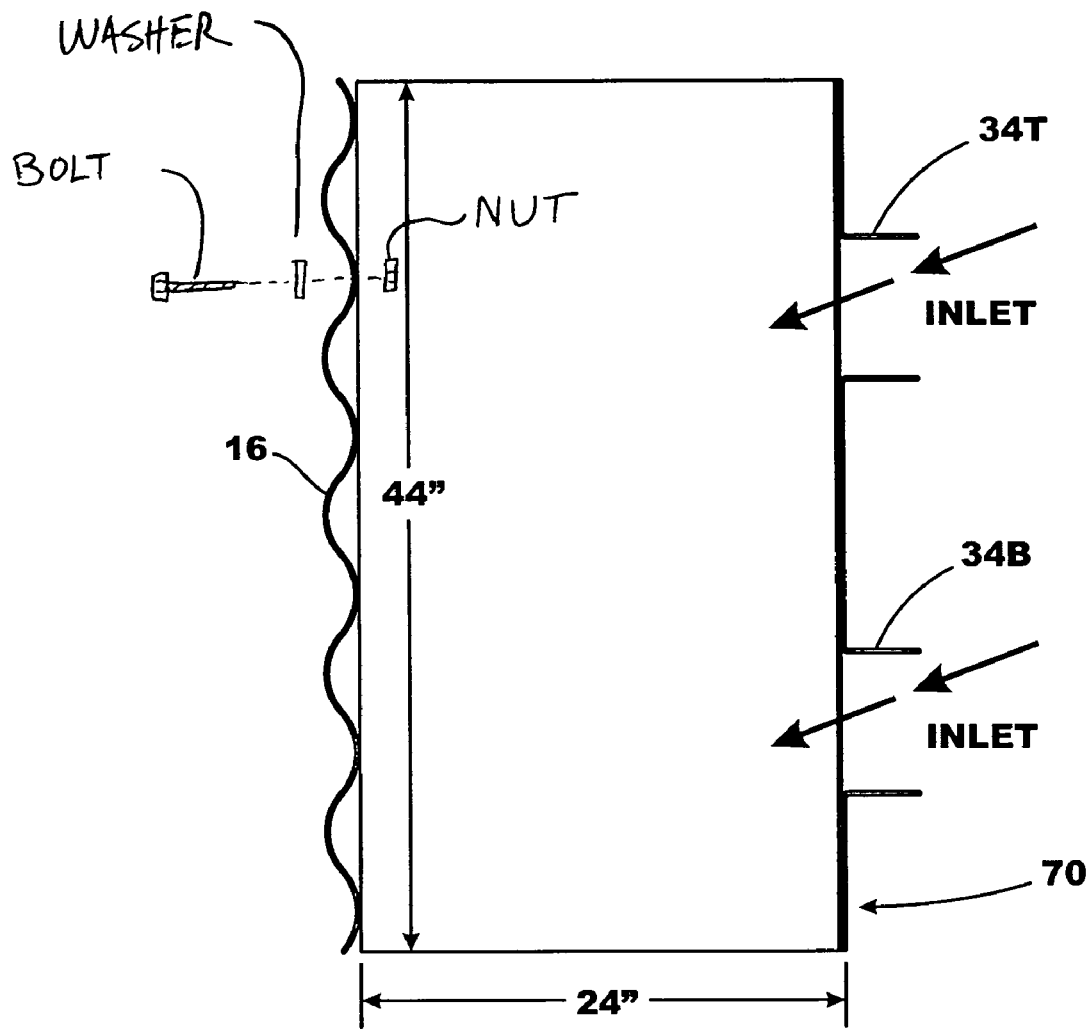
FIG. 8 is a side elevational view of one section of the side unloading system of FIG. 7.
Figure 9:
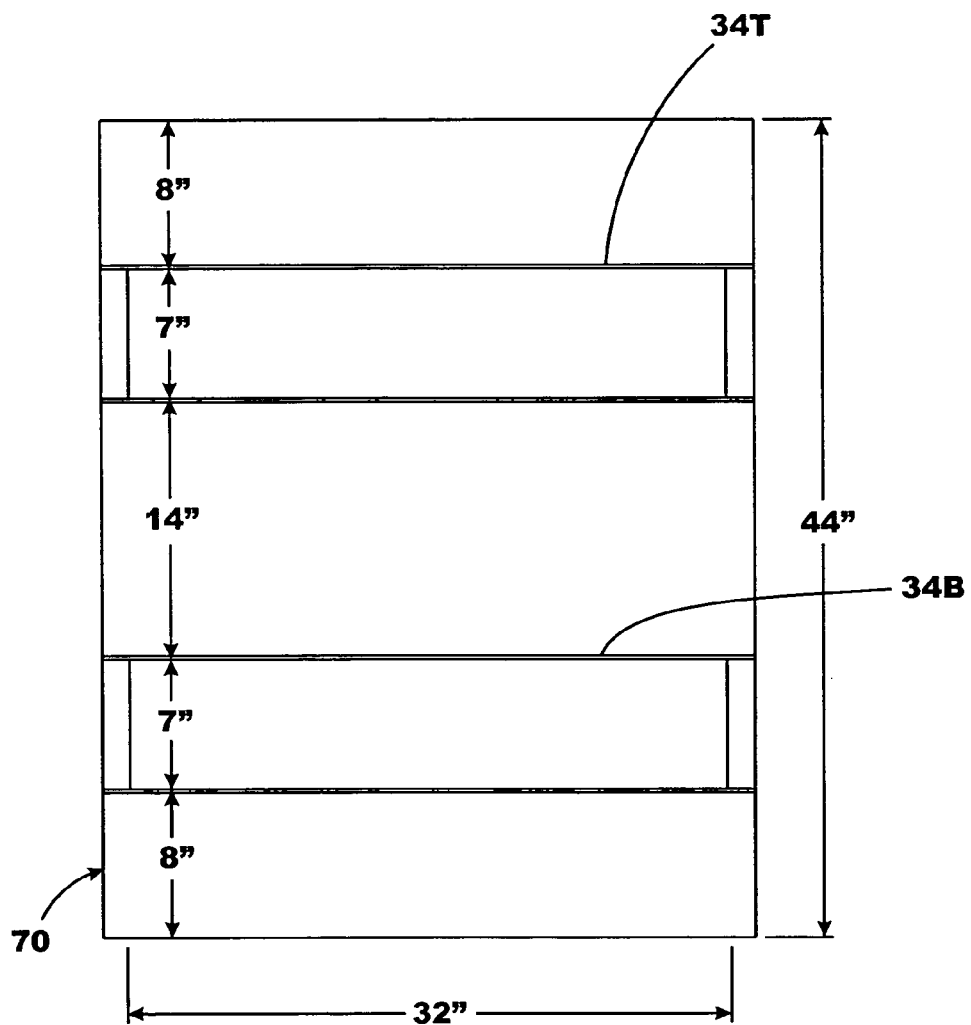
FIG. 9 is a front elevation of FIG. 8.
Figure 10:
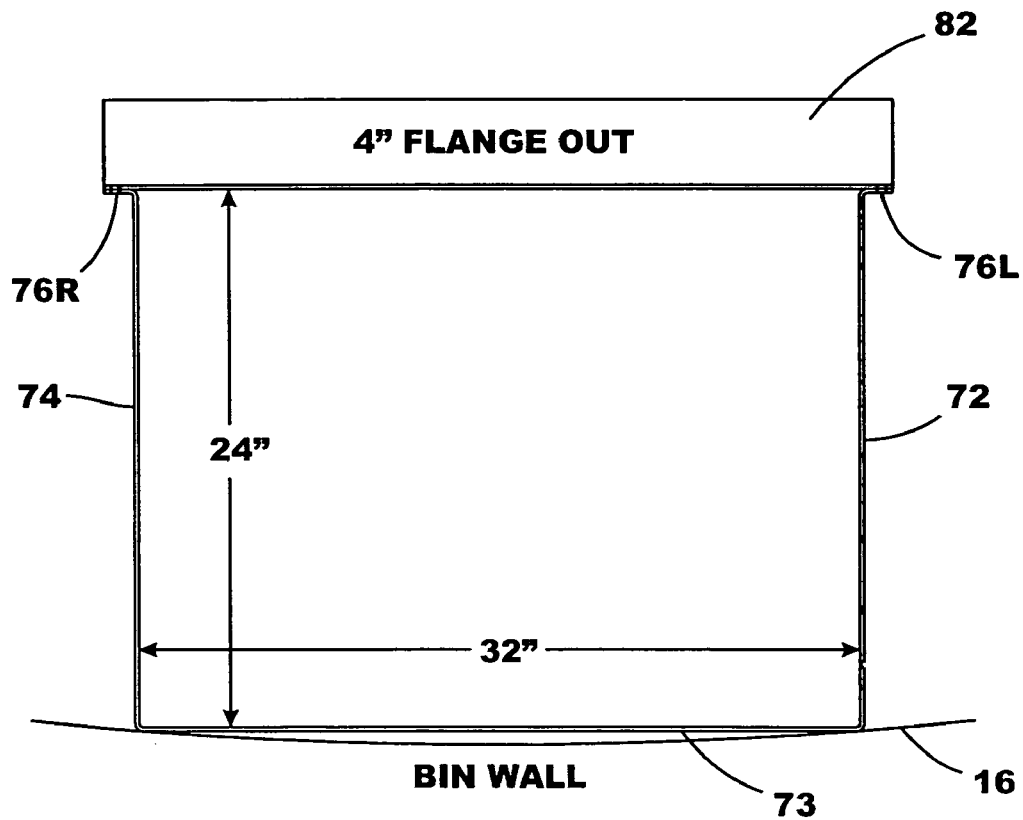
FIG. 10 is an enlarged top view of FIG. 8.

FIG. 8 illustrates that middle wall 73 of each section 70 would be bolted to corrugated side wall 16. As will be discussed more below, this takes the uneven surface of wall 16 out of play and instead presents a smooth wall for grain to flow past on its way to outlet 36.

It is to be understood that the sides of section 70 are selected such that they fit within the vertical supports 17 of bin 10. Furthermore, the sides the channel 32 is selected to encourage the flow of grain.

Figure 12:
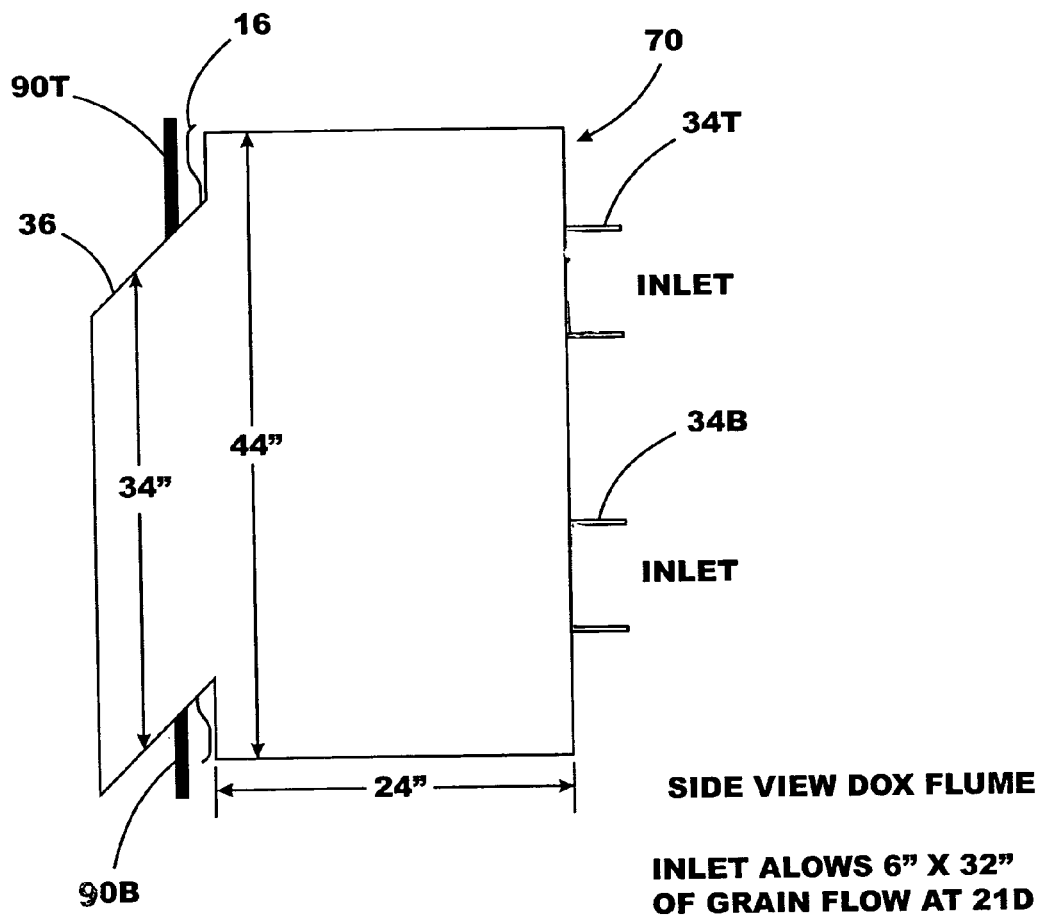
FIG. 12 is similar to FIG. 8 but for the section of the side unloading system of FIG. 7 that includes the outlet to the outside of the bin.
Figure 13:
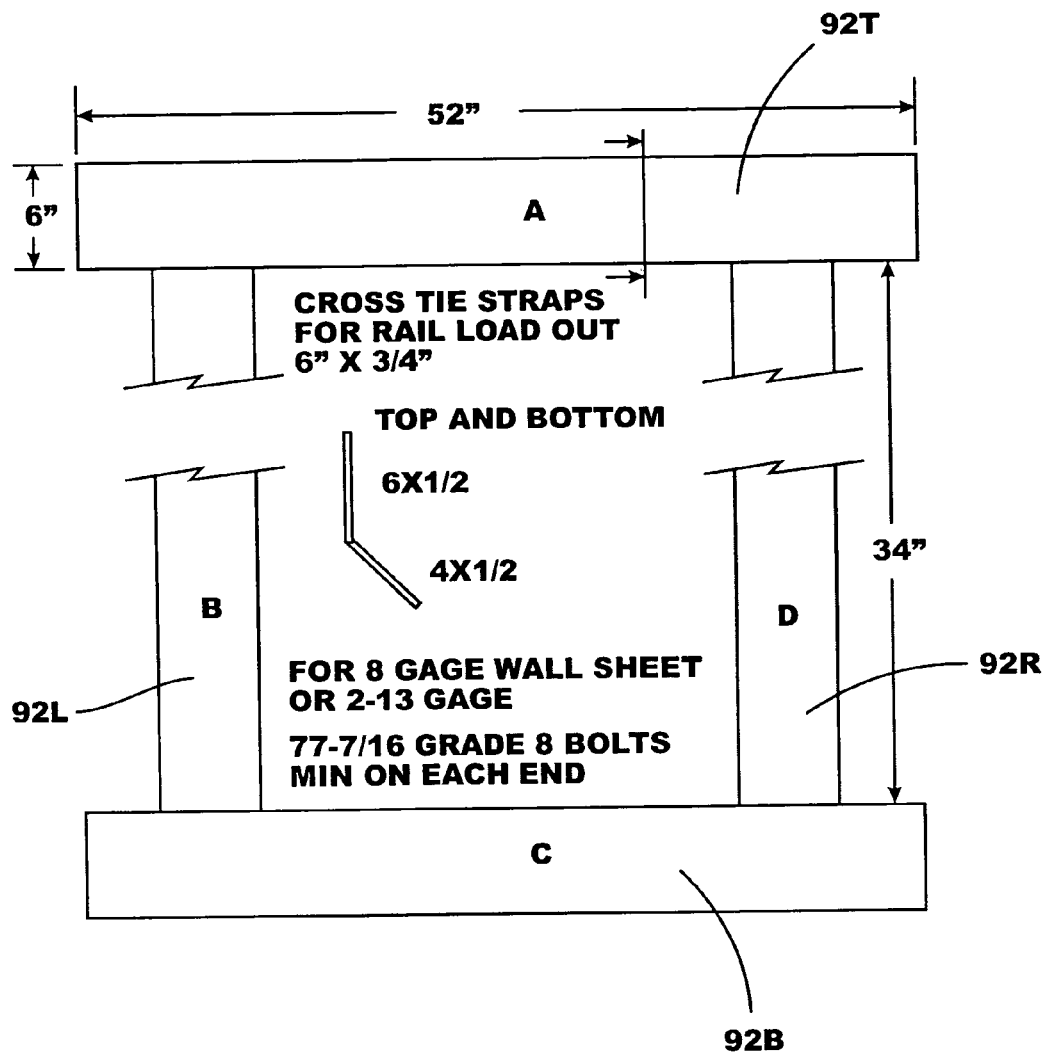
FIG. 13 is a front isolated elevation of a support structure around the outlet of FIG. 12.
Figure 14:
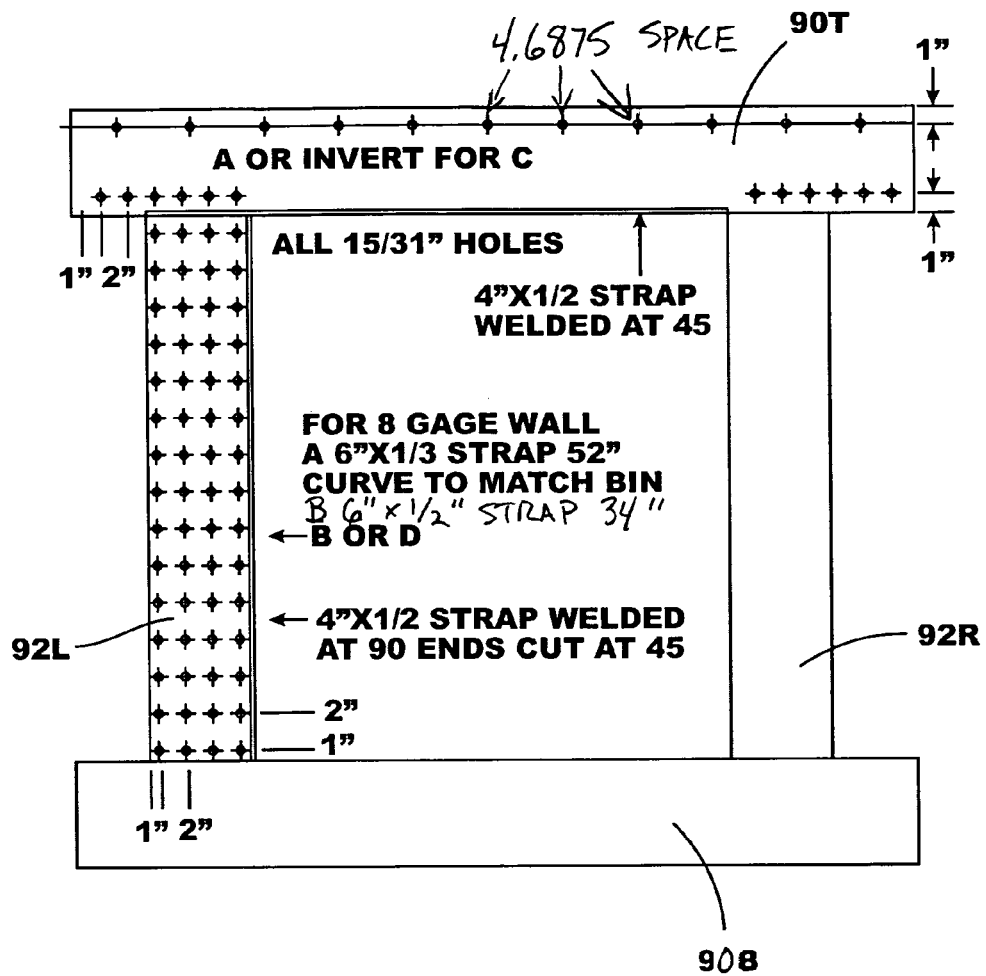
FIG. 14 is similar to FIG. 13 but shows a bolt mounting pattern for support structure to the bin.

FIGS. 12-14 illustrate section 70 with outlet 36 and a strengthening frame attachable around the opening through which outlet 36 extends. The strengthening frame consists of top and bottom horizontal cross tie straps 90T and 90B which can be bolted to bin wall 96 through bolt hole patterns shown in FIG. 14. Vertical straps 92L and R (FIG. 14) can be welded to horizontal straps 90T and 90B and bolted to side wall 16 through bolt hole pattern shown in FIG. 14.

This frame helps to strengthen the area of the bin around the opening placed in its side as well as support outlet 36.

Figure 15:
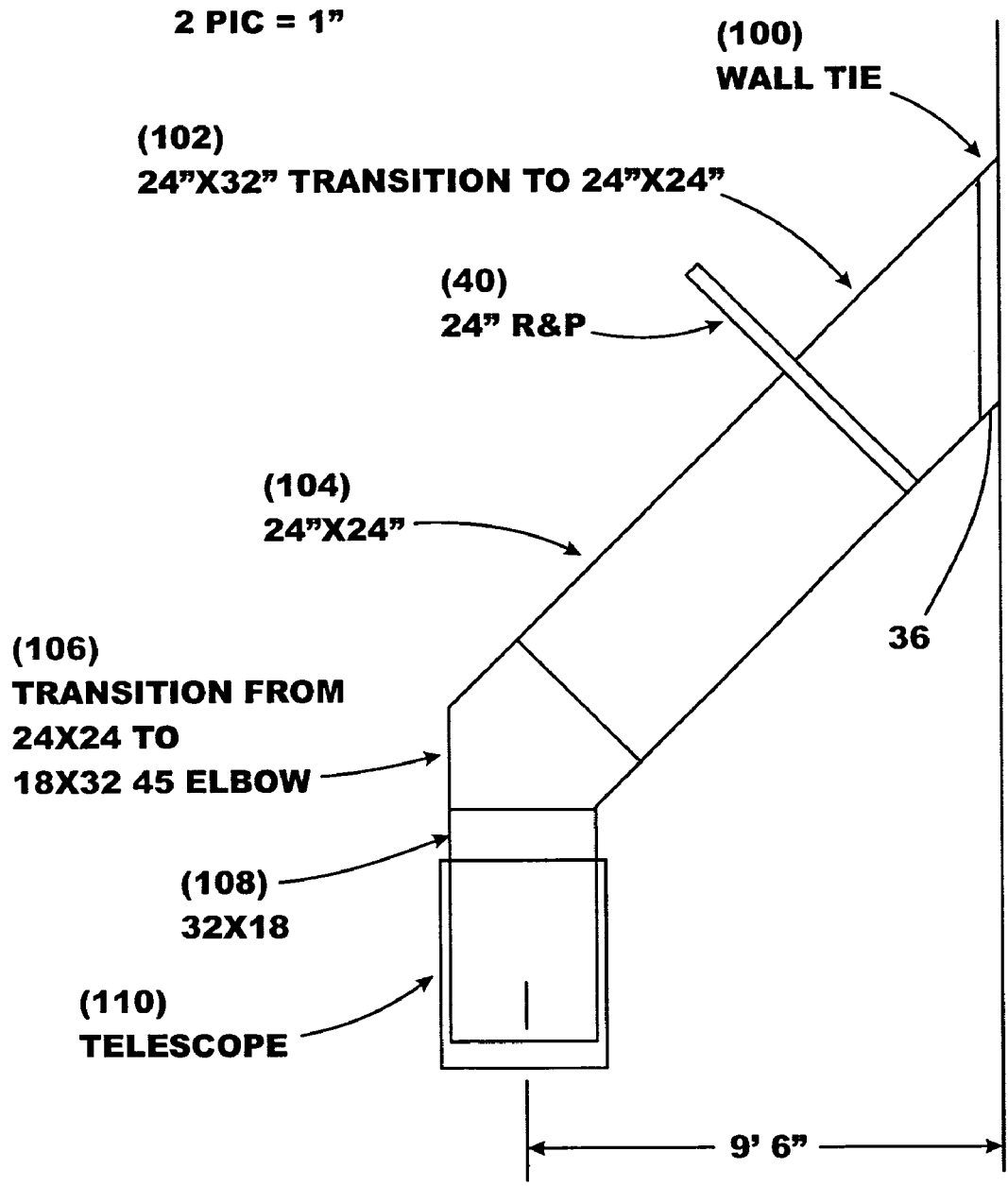
FIG. 15 is an enlarged side elevation of an unloading spout for the side unloading system of the exemplary embodiment.

FIG. 15 shows how outlet 36 can then be connected by bolts, welding or otherwise to a transition 102 that, in this example, reduces cross sectional diameter slightly. A rack and pinion gate 40 can either be manually or mechanically actuated to close and open the pathway to spout 104. Another transition 106, comprising an elbow, can then terminate in the outlet end 108. A telescoping portion 110 can translate longitudinally of end 108 to shorten or lengthen end 108.

E. Installation

Side load system 30 could be installed with the building of bin 10 in the following manner. Bin 10 is usually constructed by first building the concrete slab 12, then roof 11 on top of a first two sections of side wall 16 each 44 inches in height. The whole combination is jacked up from base 12. Succeeding 44 inch sections of wall 16 would then be built as the bin is jacked up to its final height. While this is occurring, sections 70 could succeedingly be installed starting with attachment to the roof rafters then working down as the bin 10 is being jacked up. At the appropriate time, the opening and supporting frame around it in the side wall of the bin can be formed and the section 70 with outlet 36 installed through that opening. Sections 70 below outlet 36, including bottom most section 70 with the taper 64, can complete the attachment of system 30. The bottom most section 70 could be bolted to the concrete floor 12 and outlet 36 connected to the outlet structure of FIG. 15.

F. Operation

With gate 40 closed, grain could be filled into bin 10 to its eve. Grain would find its way through openings 34 and fill substantially channel 32 as bin 10 is filled.

For fast of loading, the transportation vehicle would be pulled under spout 38, gate 40 opened, and grain would, by gravity, begin pouring out opening 36 and into the vehicle. The box beam construction of channel 32 presents smooth sidewalls to the grain. This avoids grain rubbing against wall 16 of bin 10, which heretofore has been a primary cause of damage to the sidewall of a bin 10. But further, utilizing inwardly extending horizontal inlets 34 force grain at vertical locations to feed at an angle into channel 32. The cross sectional area of openings 34 is selected to provide good flow. Much smaller openings would tend to clog. Without extension of inlets inwardly, grain could fall into channel 32 at angles substantially above horizontal. It has been found that this arrangement reduces wear and tear on components but provides good flow rates without substantial limitation on outflow.

When gate 40 is closed, outflow would stop but would be ready to be recommenced at any time. Again, gravity as the force for unloading eliminates the need for engines, motors, and moving parts.

As mentioned, once grain drops below the level of outlet 36 at the outlet 36 side of bin 10 (as shown in FIG. 3), grain could extend above the horizontal level of outlet 36 because it will doubtfully flow at angles less than 21 degrees). Either additional grain must be top loaded into bin 10 to continue unloading through system 30 or other means (e.g. auger 20) must be used to unload the remaining grain from bin 10.

G. Options and Alternatives

It is to be appreciated that the invention can take many forms and embodiments. The exemplary embodiment described herein is simply one way for practicing the invention. Variations obvious to those skilled in the art are included within the invention.

For example, the precise dimensions of system 30 can vary according to the design and need. Furthermore, the precise method of construction of system 30 can vary. It would also be possible to retro-fit it to existing structures.

It may be possible to utilize a channel without middle wall 73 (using the interior of side wall 16 of bin 10 as that wall of the channel). However, as mentioned, this may subject that portion of wall 16 to wear from movement of grain that could degrade or make wall 16 fail.

The dimensions of system 30 have been found to allow unloading of grain on the order of 3,000 to 40,000 bushels per hour. One limit is the size of the opening in the side wall 16 of bin 10. Because substantial forces are applied to that outlet area, and because of other practical limitations, the size shown in the exemplary embodiment is generally on the order of what would be recommended. Larger openings would make it more difficult to guarantee structural stability of bin 10. The force against that point, without substantial additional structural support, could actually bend or make bin 10 egg-shaped in cross section. The preferred embodiment is limited to a side opening 36 of approximately 24" by 32" because it must be cut out of a 44" tall ring of bin 10. If opening 36 were much bigger (or involved cut outs from two adjacent 44" rings, it might weaken the seam between 44" bin rings. Alternately, it might require costly additional reinforcement.

It is believed that the box beam configuration shown in the drawings adds to the structural rigidity of bin 10. The increased structure rigidity of bin 10 would also benefit wind resistance when bin 10 is empty. Sometimes during high winds, bins can deform.

Materials used can vary according to need and desire. 7 gauge mild sheet steel is one example of steel for system 30 that abuts wall 16. Galvanized metal might be used but it is not believed as strong as other types of metal. Method of connection of various parts can vary. Those skilled in the art can decide what is most effective for each installation.

One option would be to add a urethane coating to the interior of channel 32. This would resist wear of the metal. Such coatings can be applied during fabrication of sections of system 30 or applied after installation.

The size of the opening in the bin wall 16 is also a function of the thickness of the metal of wall 16.

System 30 can be used with other systems. For example, a control system can be configured to monitor rate of flow through outlet system 30 and control, e.g. by automatic actuation of gate 40, the amount of flow.

Optionally, the bottom section 70 of system 30 could be made of thicker metal, if desired, to provide increased structural integrity. It is believed that the invention represents an advantageous balance between cost and unloading speed. Bins could be strengthened by using thicker side wall material and other structural members. However, this would increase the cost of the bin perhaps by 30 to 40 percent. This could make installation and use of system 30 cost ineffective.

Optionally there could be two opening in outlets 36 along system 30 to increase output.

Using gravity is believed to reduce damage to grain at least as opposed to use of augers.

Speed of unloading is increased on the order of 10 times.

The invention includes the idea of adding a side unload gravity feed system to thin sheet metal bins to reduce production costs for user or end user. Such a system and method could make grain storage in these types of bins commercially viable and make them competitive with concrete silos. For example, use with a concrete silo or bin might allow less use of re-bar, reducing cost of construction. The invention can be used with bins of other materials (e.g. wood).

The invention can be used for most types of grain, and other particulate matter. Some examples, not by way of limitation, include granular fertilizer, recycled plastic shreds or pellets, pea gravel, and other flowable, granular substances. Size of the system 30, including opening sizes, may be optimized for different grain or particle sizes.

It is believed the invention allows the particulate matter to build momentum prior to the bin opening.

What is claimed is:

1. A fast rate, at least partial gravity unloading, relatively large capacity particulate matter storage bin apparatus comprising:
   (a) a storage bin having a floor and a roof connected by a sheet metal cylindrical vertical wall having inner and outer sides, the cylindrical vertical wall having corrugated inner and outer sides, the storage bin having a bin opening which allows the particulate matter to pass through;
   (b) a box channel assembly of sheet metal attached to the inner side of the storage bin vertical wall, defining a substantially enclosed channel for flow of particulate matter, having a generally vertical longitudinal axis, and located inside the storage bin between the floor and the roof, the box channel assembly further comprising:
   i. a first vertical wall adjacent to or in abutment with the inner side of the bin and having a substantially flat and smooth inner surface and an outlet opening intersecting the bin opening in the cylindrical vertical wall of the bin,
   ii. a second vertical wall having a substantially flat and smooth inner surface and extending generally along said longitudinal axis but spaced apart inwardly from the bin cylindrical vertical wall and the first vertical wall of the channel assembly,
   iii. a plurality of inlet openings spaced apart from one another along the second vertical wall allowing particulate matter to enter the channel by gravity, each inlet opening having a top, bottom, and opposite sides,
   iv. an inwardly extending flange or member extending from a proximal edge at the second vertical wall to a free distal edge away from the second vertical wall along the top and bottom of each opening, the respective flanges or members defining generally horizontal planar surfaces configured to direct flow through each said respective opening and into said channel and assisting in controlled flow of particulate matter into the openings;
   v. side walls on opposite sides of and extending between said second vertical wall to the first vertical wall of the channel assembly, the side walls each having a substantially flat and smooth inner surface;
   (c) so that a substantially continuous channel of sheet metal is defined from above the bin opening to the bin opening for additional strengthening of the vertical side wall of the bin, but to also deter forces on the vertical side wall by controlled flow of particulate matter by the inwardly extending flanges or members through the inlet openings and to deter frictional erosion of the particulate matter and the vertical side wall of the bin by promoting controlled flow through flat sheet metal surfaces of the substantially enclosed sheet metal channel.

2. The apparatus of claim 1 wherein the bin opening in the cylindrical vertical wall is vertically positioned far enough above the floor so that a rail car or semi-trailer can be loaded by allowing gravity to feed the particulate matter through the opening and into the rail car.

3. The apparatus of claim 1 further comprising a strengthening member attached to the cylindrical vertical wall at or near the bin opening.

4. The apparatus of claim 1 wherein the vertical side wall of the storage bin comprises a plurality of vertical sections, and the channel assembly comprises a plurality of vertical sections generally corresponding with the vertical sections of the vertical wall of the storage bin.

5. The apparatus of claim 1 wherein the channel assembly has an upper end and a lower end, the upper end being closest to the roof and the lower end being closest to the floor, the apparatus further comprising a plurality of stabilizing members connecting the upper end of the channel assembly to support rafters in the roof.

6. The apparatus of claim 5 wherein the lower end of the channel assembly comprises an opening.

7. The apparatus of claim 6 wherein the lower end of the channel assembly is tapered.

8. The apparatus of claim 1 wherein the cylindrical vertical wall of the storage bin comprises a plurality of corrugated sheets attached together.

9. The apparatus of claim 8 wherein the bin opening in the cylindrical vertical wall is located entirely within one of the corrugated sheets.

10. The apparatus of claim 1 wherein the channel assembly comprises interior surfaces and a substantially smooth coating on the interior surfaces.

11. A method for obtaining high throughput gravity feed of particulate matter from a relatively large capacity particulate matter storage bin wherein the storage bin has a floor and a roof connected by a sheet metal cylindrical vertical wall, the method comprising:
   (a) providing a bin opening in the cylindrical vertical wall of the storage bin;
   (b) attaching to the vertical wall of the storage bin a substantially enclosed sheet metal box channel for flow of particulate matter inside the storage bin between the floor and the roof and intersecting the bin opening in the cylindrical vertical wall, the channel being defined by a sheet metal assembly including a first portion covering a portion of the inside of the cylindrical vertical wall of the storage bin and a second portion positioned inwardly of the first portion and including a plurality of inlet openings spaced apart vertically along the assembly;
   (c) utilizing gravitational force to direct particulate matter into the plurality of inlet openings, through the channel defined by the assembly, through the bin opening in the cylindrical vertical wall, and into a receiving container external of the bin;
   (d) regulating flow of particulate matter as it enters each opening by placing an inwardly extending member extending from a proximal edge of the second portion to a free distal edge away from the second portion at or near one or more of the plurality of inlet openings, the members defining generally horizontal planar surfaces configured to direct flow through each said respective opening and into said channel.

12. The method of claim 11 wherein the cylindrical vertical wall is constructed by:
   (i) attaching a roof to a first section of cylindrical vertical wall,
   (ii) raising the roof and first section and attaching underneath it a second section of cylindrical vertical wall with a corresponding section of the assembly defining the channel mounted to the second section;
   (ii) raising the preceding combination and adding further sections of cylindrical vertical wall and channel assembly until the location of the bin opening;
   (iv) adding a section of cylindrical vertical wall with the said bin opening and an outlet opening of the channel assembly aligned therewith.

13. The method of claim 11 wherein the channel has an upper end and a lower end, the upper end being closest to the roof and the lower end being closest to the floor, further comprising placing an opening in the lower end of the channel.

14. The method of claim 13 further comprising tapering the lower end of the channel.

15. The method of claim 14 further comprising utilizing a mechanical unloading system located in the floor of the storage bin to unload remaining particulate matter after particulate matter can no longer flow under the force of gravity through the bin opening in the cylindrical vertical wall.

16. An improvement to a particular matter storage bin having a floor and a roof connected by a corrugated sheet metal cylindrical vertical wall, the cylindrical vertical wall having a bin opening which allows the free flow of particulate matter through it by gravity but which is limited in size by the size of the storage bin and strength of the corrugated sheet metal, the improvement comprising;
   (a) a sheet metal box channel assembly defining a channel for flow of particulate matter having a longitudinal axis and located inside the storage bin between the floor and the roof, the channel intersecting the bin opening in the cylindrical vertical wall, the channel assembly further comprising a box beam type construction comprising:
      (i) an outer side that is attached to the cylindrical vertical wall;
      (ii) an outlet opening in the outer side that intersects the bin opening in the cylindrical vertical wall;
      (ii) an inner side generally along said longitudinal axis of the channel, but spaced apart inwardly from the cylindrical vertical wall;
      (iv) a plurality of inlet openings spaced along the inner wall which allow particulate matter to enter, by gravity, the channel, each inlet opening having a top and bottom;
      (v) a member extending from at or near the top of an inlet opening to regulate the gravity flow of the particulate matter into the inlet opening extending from a proximal edge of the inner side to a free distal edge away from the inner side, the respective members defining generally horizontal planar surfaces configured to direct flow through each said respective opening and into said channel;
   (b) a spout extending outside the storage bin and in communication with the bin opening in the cylindrical vertical wall; and
   (c) a mechanical unloading system in the floor of the storage bin for unloading a remainder of particulate matter after it can no longer flow by gravity out of the bin opening in the cylindrical vertical wall.

17. The combination of claim 16 wherein the spout includes a stop gate therein to regulate the flow of particulate matter through the bin opening in the cylindrical vertical wall.

* * * * *